(12) United States Patent
Pflueger et al.

(10) Patent No.: US 10,581,040 B2
(45) Date of Patent: Mar. 3, 2020

(54) MODULE HOUSING FOR A BATTERY MODULE

(71) Applicant: Robert Bosch GmbH, Stuttgart (DE)

(72) Inventors: Claus Gerald Pflueger, Markgröningen (DE); Klaus Wipfler, Niefern-Oeschelbronn (DE); Klaus Spieske, Stuttgart (DE); Rainer Menig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 15/886,146

(22) Filed: Feb. 1, 2018

(65) Prior Publication Data

US 2018/0219198 A1    Aug. 2, 2018

(30) Foreign Application Priority Data

Feb. 2, 2017   (DE) .................. 10 2017 201 710

(51) Int. Cl.
| | |
|---|---|
| *H01M 2/10* | (2006.01) |
| *H01M 10/6556* | (2014.01) |
| *H01M 10/613* | (2014.01) |
| *H01M 10/42* | (2006.01) |
| *H01M 10/625* | (2014.01) |
| *H01M 2/20* | (2006.01) |
| *H01M 10/48* | (2006.01) |

(52) U.S. Cl.
CPC ....... *H01M 2/1083* (2013.01); *H01M 2/1077* (2013.01); *H01M 2/202* (2013.01); *H01M 10/425* (2013.01); *H01M 10/613* (2015.04); *H01M 10/625* (2015.04); *H01M 10/6556* (2015.04); *H01M 2/206* (2013.01); *H01M 10/48* (2013.01); *H01M 2220/20* (2013.01)

(58) Field of Classification Search
CPC ............. H01M 2/1083; H01M 10/613; H01M 10/625; H01M 10/6556; H01M 2/1077; H01M 2/202; H01M 10/425; H01M 2/206; H01M 10/48
See application file for complete search history.

(56) References Cited

U.S. PATENT DOCUMENTS

| | | | |
|---|---|---|---|
| 2012/0094164 A1 | 4/2012 | Wuensche | |
| 2016/0093847 A1 | 3/2016 | Gunther et al. | |

FOREIGN PATENT DOCUMENTS

| | | |
|---|---|---|
| DE | 102013209691 | 11/2014 |
| DE | 102015115138 | 3/2016 |

*Primary Examiner* — Helen Oi K Conley
(74) *Attorney, Agent, or Firm* — Michael Best & Friedrich LLP

(57) ABSTRACT

A module housing (11) for a battery module (10) having at least one battery cell (12) exhibiting a first substantially L-shaped housing side wall (14) with at least one clip connection (17), and a second substantially L-shaped housing side wall (14) with at least one clip connection (17) and two housing plates (15) which can be arranged on the battery module (10) on the end face, as a result of which the module housing is closable on the end face. At least the two housing side walls (14) can be connected to one another mechanically in a form-fitting and/or force-fitting manner by means of clip connections (17), as a result of which a cuboid module housing (11) can be produced.

18 Claims, 3 Drawing Sheets

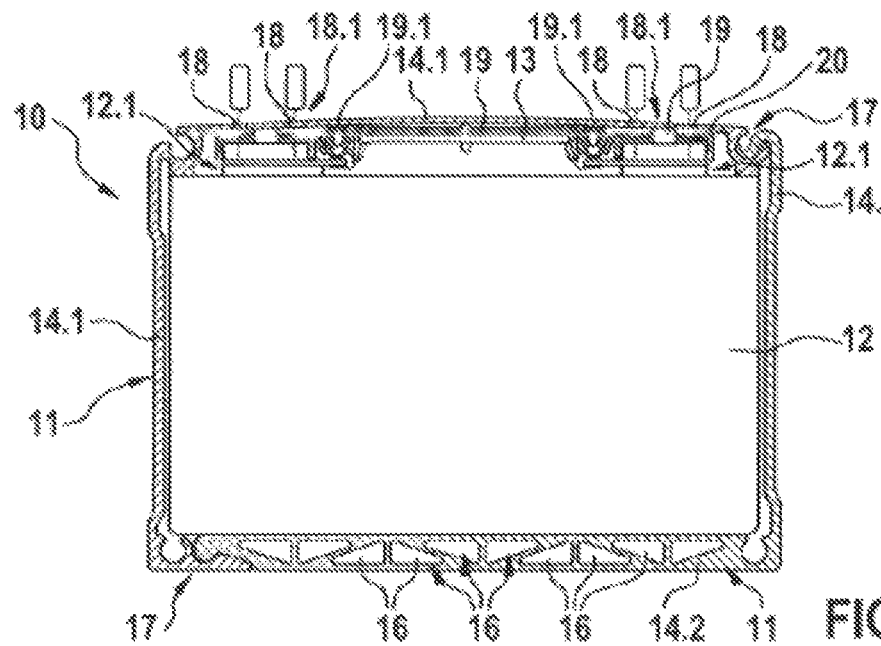
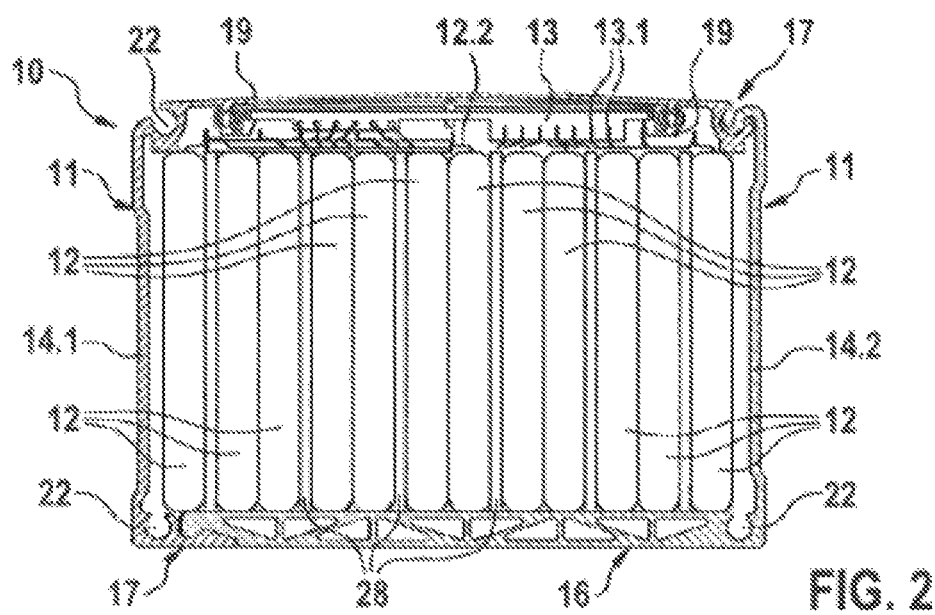
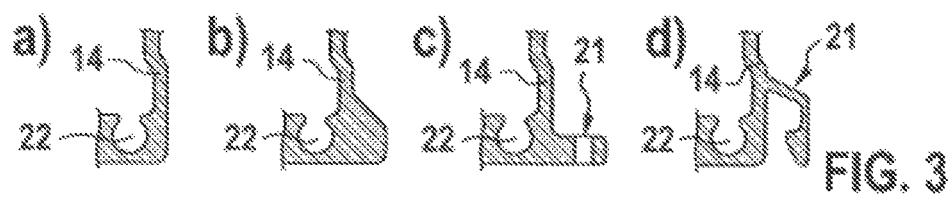
FIG. 1
FIG. 2
FIG. 3

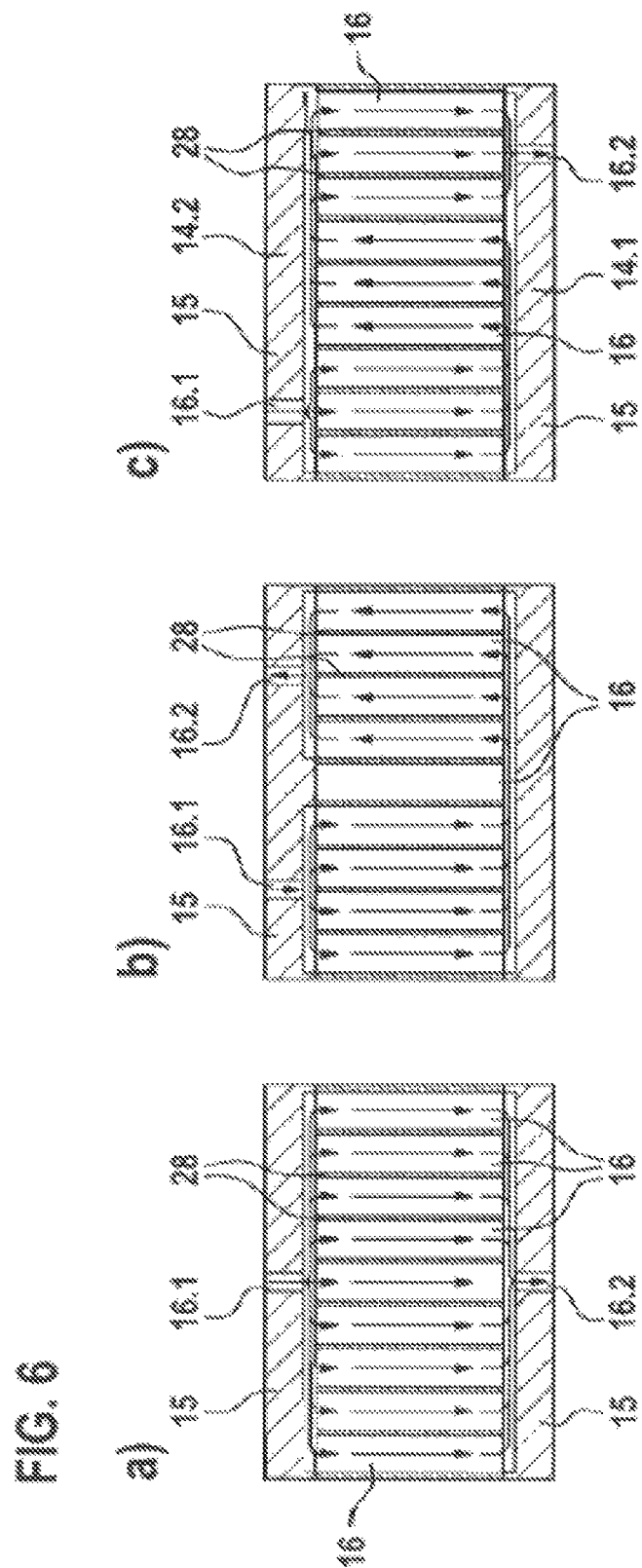

MODULE HOUSING FOR A BATTERY MODULE

BACKGROUND OF THE INVENTION

The present invention relates to a module housing for a battery module and also a battery module and an assembly process. Furthermore, the invention relates to a battery, in particular for an at least electrically drivable vehicle, exhibiting a plurality of battery modules according to the invention.

A module housing for a battery module is known from DE 10 2015 115 138 A1, said module housing being made up of two substantially L-shaped housing side walls which can be connected to one another in a force-fitting manner by means of screw connections that involve complicated assembly.

SUMMARY OF THE INVENTION

According to a first aspect of the invention, a module housing is proposed for a battery module having at least one battery cell, wherein the module housing has a first substantially L-shaped housing side wall with at least one clip connection, and a second substantially L-shaped housing side wall with at least one clip connection. Moreover, the module housing has two housing plates which can be arranged on the battery module on the end face, as a result of which the module housing is closable on the end face. At least the two housing side walls can be connected to one another mechanically in a form-fitting and/or force-fitting manner by means of clip connections, as a result of which a cuboid module housing can be produced particularly easily.

Further features and details of the invention result from the dependent claims, the description and the drawings. In this case, features and details which have been described in connection with the module housing according to the invention of course also apply in relation to the battery module according to the invention, the battery according to the invention and/or the method according to the invention, and vice versa in each case, so that reference is always made, or can be made, to the individual aspects of the invention reciprocally.

Within the framework of the invention, a battery cell is understood to mean a prismatic cell, a nutshell cell, a pouch cell or a MarCell cell, for example.

A housing side wall according to the invention may be understood within the context of the invention to mean a component which has two housing walls extending in different directions, in particular at right angles to one another, and are preferably configured in one piece (relative to one another). Accordingly, the housing side walls have a substantially L-shaped design, wherein the two legs of the respective housing side wall can be configured with equal lengths or different lengths. The two housing plates which can be arranged on the end face of the battery module are preferably configured in such a manner that a housing plate can be arranged on an end face in a form-fitting manner on each of the housing side walls, so that a substantially cuboid module housing is produced which is closed on all sides by the housing side walls or housing plates. Hence, a mechanically inherently stable module housing is produced according to the invention. It is conceivable according to the invention for the housing side walls and/or the housing plates to be produced as extruded sections or sheet-metal profiles or a combination thereof. In particular, the extruded profiles may be made of lightweight metal, aluminum and/or plastic. The housing plates furthermore allow the two L-shaped housing side walls to be reinforced and the detachment of the clip connections to be reliably prevented. It is conceivable for the two substantially L-shaped housing side walls and/or the housing plates, in particular the housing side walls with the housing plates, to be additionally connected to one another in a form-fitting/force-fitting/frictional and/or substance-bonded manner. For example, the housing side walls and/or the housing plates can be screwed, riveted and/or adhered and/or soldered. At least the two housing side walls are connected to one another according to the invention by means of the clip connection in a mechanically form-fitting and/or force-fitting manner, as a result of which a simple and quick assembly can be achieved and a mechanically inherently stable module housing produced. The clip connection likewise makes it easily possible for the module housing to be dismantled, in particular the two L-shaped housing side walls, so that defective battery cells and/or defective electronic components, for example, can be maintained and/or replaced. If the housing side walls and/or the housing plates are made of a metallic material, the metallic material likewise allows a cooling property of the battery cells and/or of the electronic units. Housing side walls and/or housing plates produced from a plastic facilitate a weight-optimized module housing which can likewise be produced cost-effectively. The housing side walls and/or the housing plates can be produced as continuous profiles and then shortened to the desired length. The housing side walls and/or the housing plates may exhibit aluminum and/or sheet steel and particularly be configured as extruded profiles. The clip connections may preferably be configured on the housing side walls. Furthermore, clip connections may be configured on the housing plates, so that the housing plate and the housing side walls can be mechanically connected to one another in a form-fitting and/or force-fitting manner. The clip connections in this case are preferably arranged on the housing side walls and/or the housing plates in such a manner that on the respective ends of the L-shaped housing side walls, the clip connections are formed from the housing side wall. Consequently, the two L-shaped housing side walls can be clipped in one another at both ends of the L-shaped legs of the housing side walls. "Clipping" within the framework of the invention also means a telescoping or locking. It may be advantageous for this purpose for the housing side walls to be configured partially elastically, at least in sections, so that the clip connections engage with one another through the application of force and thereby lock them. It is also conceivable for the clip connections to be formed in such a manner that the two housing side walls can only be clipped or interlocked in one another in a given position. Consequently, it may be possible for the two housing side walls to be pushed together only in the longitudinal direction.

Within the framework of the invention, it is conceivable for at least one opening to be arranged on at least one housing side wall in such a manner that energy for joining a pole/terminal of the battery cell to a cell connector and/or to a signal line for an electronic unit can be introduced, wherein the opening in particular is of such dimensions that a shock-proof protection for the battery cell can be achieved. Energy for joining, in particular soldering, the battery cell terminals can be introduced through the openings, so that a cell connector and/or a signal line for an electronic unit can be connected in an electrically conductive manner to the battery cell. The opening is preferably of such dimensions that a shock-proof protection for electrically conductive or live components can be achieved. In particular, it is thereby possible for individuals from outside to accidentally come into contact with live components. The openings in this case may be prismatic recesses in at least one housing side wall, wherein the openings in particular are positioned on the housing side wall in such a manner that thermal energy for joining can be introduced. The openings are preferably located on at least one side of at least one housing side wall which covers the battery cell in the region of the battery cell terminals.

Within the framework of the invention, it may be advantageous for cooling ducts to be configured on at least a first housing side wall and/or a second housing side wall and/or a housing plate, wherein a cooling fluid can be conducted through the cooling ducts, wherein the cooling ducts are configured in such a manner that a cooling fluid can be introduced through at least a first connection piece and discharged through a second connection piece, wherein the connection pieces, in particular, are arranged on at least one housing plate. The cooling ducts may extend in accordance with the invention through at least a first housing side wall and/or a second housing side wall in a meandering manner, for example. In this case, the cooling ducts may be arranged on at least one longitudinal face of the module housing, preferably on two longitudinal faces of the module housing, particularly preferably on three longitudinal faces of the module housing. The cooling ducts preferably extend on a first housing side-wall which along with a leg forms the base of the module housing. The base in this case is formed by the side of the module housing which lies opposite the battery cell terminal. Consequently, the battery cells can be cooled on at least one side, preferably on two sides, particularly preferably on three sides, in particular by a cooling fluid. The cooling fluid can be introduced into a first and/or a second housing side wall via at least a first connection piece. The connection piece and/or a housing plate may in this case be configured as a distributor unit, so that where there is a plurality of cooling ducts, the cooling fluid can be distributed between the cooling ducts, in order to achieve a good cooling action. Moreover, it is conceivable for the cooling fluid to be dischargeable from the housing side walls, and therefore from the module housing, via a second connection piece. It may be advantageous for the cooling ducts to be connected to one another, so that a cooling fluid flow through a plurality of cooling ducts can be facilitated, at least within a housing side wall.

It may be advantageous for a carrier element to be provided, on which an electronic unit can be arranged in a form-fitting and/or force-fitting manner, wherein the carrier element is connected to at least one housing side wall via a carrier receiving means in a force-fitting and/or form-fitting manner. Consequently, the electronic unit may also be attached simply and reliably to the module housing. The carrier receiving means in this case may be configured as a clip connection and/or a locking connection. The electronic unit may be a battery management system (BMS) or a cell supervision circuit (CSC), for example. The electronic unit in this case is preferably connected in an electrically conductive manner to the cell connectors and/or the battery cell terminals. The electronic unit configured as a PCB, for example, may be connected in a force-fitting and/or form-fitting manner via a carrier element according to the invention. The carrier element in this case is preferably configured on at least one housing side wall, in particularly in an integral manner, so that the carrier element can be connected to at least the one housing side wall in a force-fitting and/or form-fitting manner via a carrier receiving means. The carrier element and/or the carrier receiving means in this case may be made of the same material as the housing side wall, in particular of a metallic material or a plastic. Consequently, it can be achieved that the electronic unit can be arranged fixed in the module housing and, in particular, protected from external mechanical influences. A simplified assembly of the electronic unit, in particular on an inside of the module housing, is made possible via the carrier elements and the carrier receiving means.

It is furthermore conceivable for the carrier element to have a receiving means for at least one cell terminal and/or a cell connector, as a result of which the carrier element can be connected to the cell terminal and/or the cell connector in a force-fitting and/or form-fitting manner. Consequently, an additional mechanical stabilization for the carrier element and therefore the electronic unit can be achieved. As a result, the carrier element may exhibit a receiving means which is configured to correspond geometrically to the cell connector and/or the cell terminal. It is likewise conceivable for the receiving means of the carrier element to be able to lock with the cell connector and/or the cell terminal. The carrier element, which is preferably integrally configured with at least one housing side wall, can therefore achieve greater stability, in that the carrier side wall is in addition mechanically fixed to the battery cell via the receiving means of the carrier element. Consequently, the module housing, on the one hand, and also the electronic unit is mechanically fixed in addition.

It may be advantageous for at least one clip connection to be configured in a substantially S-shaped and/or O-shaped and/or wedge-shaped design. It is likewise conceivable for at least one clip connection on a housing side wall to be configured in a hinge-like manner, so that a first clip connection is configured in such a manner that the two housing side walls can display a rotational axis, wherein the housing side walls can be pivoted in respect of one another about the rotational axis produced by the clip connection. A second clip connection on the second housing side wall is preferably configured in such manner in this case that through an interlocking of the two housing side walls with one another, the second clip connection interlocks. Consequently, during assembly the first clip connection can initially connect the two housing side walls to one another, wherein a rotational axis of the two housing side walls is produced by the first clip connection, so that the two housing side walls are movably configured in respect of one another about the clip connection and the second clip connection is used to suppress the axial rotation of the two housing side walls in respect of one another through a force-fitting and/or form-fitting connection. It is likewise conceivable for at least one carrier element and/or a carrier receiving means to have a substantially S-shaped and/or O-shaped and/or wedge-shaped design.

The clip connections may preferably be configured in such a manner with an S-shaped and/or O-shaped design that via the S-shaped and/or O-shaped clip connection a rotational axis is created, wherein the housing side walls can be configured to correspond to one another geometrically in the region of the clip connections. Consequently, the housing side walls can engage with one another at the clip connections, at least sectionally, and be rotated in respect of one another in at least one direction by an S-shaped and/or O-shaped embodiment of the clip connection. A second clip connection facilitates a force-fitting and/or form-fitting connection of the two housing side walls in such a manner that a movement about the rotational axis formed by the first clip connection is prevented, as soon as the second clip connection fixes the two housing side walls in a force-fitting and/or form-fitting manner.

Within the framework of the invention it may be advantageous for the housing side walls to exhibit fastening means, as a result of which the module housing can be disposed on an external component in a force-fitting and/or form-fitting manner. An external component in this case may, for example, be a component of a vehicle, in particular the body of a motor vehicle. The fastening means in this case may be configured on the housing side walls in a pin-shaped manner and exhibit material openings, so that bolts, screws and/or rivets for fastening the housing side walls to an external component can be disposed. In addition, it is conceivable for the fastening means on the housing side walls to be configured as clip, locking and/or clamping connections. This means that the module housing can be fixed to an external component, so that the module housing can be secured to prevent mechanical influences.

It may be advantageous for at least one housing side wall and at least one housing plate to exhibit connection element receiving means in which connection elements can be disposed, as a result of which the housing side walls can be connected to at least one further housing side wall and/or an external component and/or a housing plate of a further battery module.

According to a second aspect of the invention, a battery module, in particular for a motor vehicle, is claimed. The battery module has a module housing according to the invention with at least one battery cell arranged in the module housing and an electronic unit, wherein the electronic unit is in signal connection with at least one battery cell. Accordingly, all the same advantages as have already been described in connection with the module housing according to the invention result for the battery module according to the invention. The module housing has two housing side walls for this purpose which are substantially L-shaped in design and wherein at least one battery cell is arranged on the two housing side walls, so that the battery cell is surrounded by the housing side walls on at least four sides. The electronic unit in this case is arranged, preferably clipped and/or locked, within the module housing on at least one housing side wall. The electronic unit in this case is connected in electrical signal connection to at least one battery cell, wherein the electronic unit is connected via mechanical connection elements (lines, punched grids) or wirelessly to the battery cell. The electronic unit may be a battery management system and/or a CSC system according to the invention and have a PCB (printed circuit board), for example. The two housing side walls of the module housing are configured according to the invention with a substantially L-shaped design and are arranged on the battery cell in such a manner that the battery cell is covered on at least two sides by a housing side wall in each case.

Within the framework of the invention, an end terminal may be arranged on at least one housing plate, in particular integrated in the housing plate, as a result of which a voltage tapping of the battery module can be achieved, wherein the end terminal in particular has a connection bolt and a terminal insulation arranged on the connection bolt, wherein the connection bolt can be connected to at least one battery cell in an electrically conductive manner. The end terminal may therefore be used as a voltage tap of the battery module, so that an electrical consumer or a further battery module can be attached to the end terminal. The end terminal is therefore configured in an electrically conductive manner and has at least one terminal insulation arranged on the connection bolt, wherein the terminal insulation is preferably arranged peripherally on the end terminal or on the connection bolt of the end terminal. Consequently, the connection bolt of the end terminal may, in particular, be electrically insulated in respect of the housing plate.

It is conceivable for at least one cooling element to be arranged between at least two battery cells, as a result of which thermal energy can be diverted from the battery cell, wherein the cooling elements, in particular, are connected to the cooling ducts in a thermally conductive manner. Consequently, a cooling interface between the cooling elements and the cooling ducts can be produced. The cooling elements which are arranged between at least two battery cells therefore allow a further cooling possibility and consequently a removal of thermal energy from the battery cells. The cooling elements in this case may have a plate-like, film-like or rod-like design, for example. The cooling elements may preferably be arranged via tongue-and-groove connections in at least one housing side wall in a force-fitting and form-fitting manner. Consequently, a mechanical fixing of at least two battery cells in the module housing can likewise be achieved. The cooling elements preferably have a metallic material, for example copper, aluminum, steel or similar materials. Moreover, it is conceivable for the cooling elements to be of lamellar design, so that the largest possible surface is created for cooling the battery cells. The cooling elements may, in particular, be connected to the cooling ducts in a thermally conductive manner, so that thermal energy can be removed from the cooling elements via the cooling ducts. It is also conceivable for a cooling fluid to be capable of flowing along the cooling elements, so that further thermal energy can be diverted from the battery cells via the cooling fluid.

It may be advantageous according to the invention for the battery cells to be electrically connected to the electronic unit by means of punched grids or a cable tree. A punched grid is particularly easy and cheap to produce. The use of cable trees allows a more flexible wiring within the module housing.

According to a further third aspect of the invention, a battery, in particular for an at least electrically drivable vehicle, is claimed. The battery has a plurality of battery modules according to the invention, so that the battery according to the invention brings with it the same advantages as those that have already been described in connection with the module housing according to the invention and the battery module according to the invention.

According to a fourth aspect of the invention, an assembly method for a battery module in accordance with the invention is claimed. The method in this case involves the following steps:

arrangement of at least one battery cell on a first housing side wall, connection of the first housing side wall to a second housing side wall by means of clip connections, connection of the housing side walls to at least two housing plates arranged on the end face, and thermal joining of at least one cell connector to the battery cell and/or at least one signal line.

The process steps in this case may run simultaneously or sequentially, at least in part, wherein the sequence of the process steps is not limited to the sequence defined by the numbering, which means that individual steps can be implemented in a different sequence.

Through the thermal joining of the cell connector to the battery cell and/or at least one signal line, an electrically conductive connection between the battery cells and/or between a battery cell and an electronic unit is produced via a signal line.

Further measures improving the invention result from the following description of some exemplary embodiments of the invention which are depicted schematically in the figures. All features and/or advantages emerging from the claims, the description or the drawings, including structural details and spatial configurations, may be essential to the invention, both independently and also in a wide variety of combinations. It should be noted in this case that the figures are only descriptive in nature and are not intended to limit the invention in any way. In the following figures, identical reference numbers are used for the same technical features, even in different exemplary embodiments.

BRIEF DESCRIPTION OF THE DRAWINGS

In the figures:

FIG. 1 shows a first possible embodiment of a battery module according to the invention, FIG. 2 shows a further possible embodiment of a battery module according to the invention, FIG. 3 shows possible embodiments a), b), c) and d) of connection element receiving means of a housing side wall according to the invention, FIG. 6 shows possible embodiments a), b) and c) of cooling elements and cooling ducts of the battery module according to the invention.

DETAILED DESCRIPTION

Figure 4:
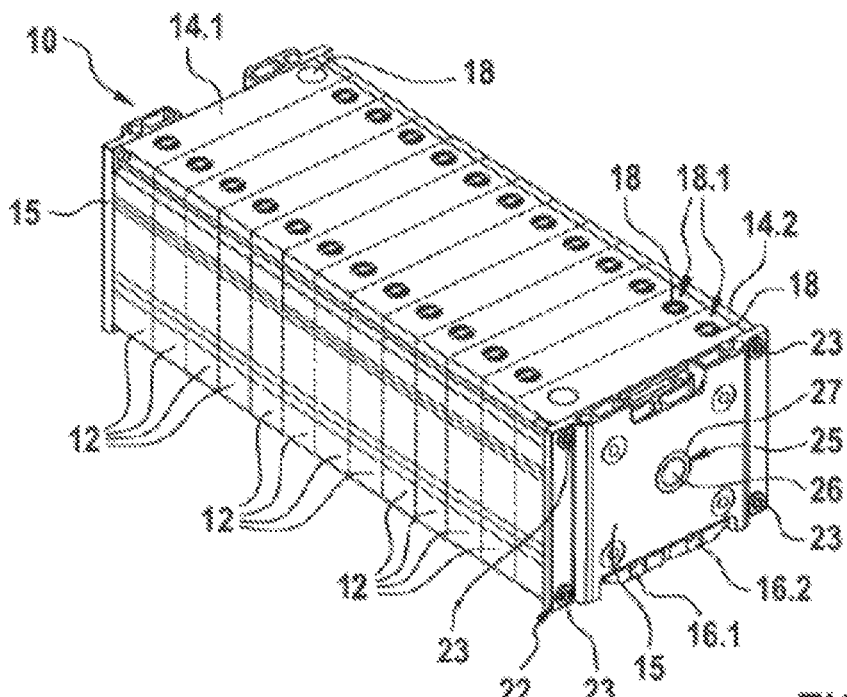
FIG. 4 shows a further possible embodiment of a battery module according to the invention.

FIG. 1 shows a first possible exemplary embodiment of a battery module 10 according to the invention. The battery module 10 has a module housing 11 with at least one battery cell 12, wherein the module housing 11 is formed from two housing side walls 14 which are connected by clip connections 17. The first housing side wall 14.1 forms the cover and also a side wall of the module housing 11, wherein the second housing side wall 14.2 creates the base and a further side wall of the module housing 11. In the second housing side wall 14.2 cooling ducts 16 are formed in the housing side wall 14.2 in the region of the base. The two housing side walls 14.1 and 14.2 are substantially L-shaped in design, wherein each housing side wall 14.1 and 14.2 has clip connections 17 at the ends which preferably correspond geometrically to the clip connections 17 of the other housing side wall 14.1, 14.2 in each case. Via the clip connections 17 according to the invention, the two housing side walls 14.1 and 14.2 may be mechanically connected to one another in a form-fitting and/or force-fitting manner, as a result of which a cuboid module housing 11 can be produced. The first housing side wall 14.1 has in the region of the cover section two openings 18 in each case in the region of the cell terminals 12.1 of the battery cell 12. Via the openings 18, thermal energy for joining the cell terminal 12.1 of the battery cell 12 to a cell connector 12.2 or a signal line 13.1 can be facilitated accordingly. The openings 18 are geometrically configured in such a manner in this case that a shock-proof protection 18.1 is created, so that contact with electrically conductive components of the battery cell 12 from outside can be essentially prevented. On the first housing side wall 14.1, carrier receiving means 19.1 are moreover configured on the housing side wall 14.1 in the region of the module housing cover of the housing side wall 14.1, which forms the cover element. A carrier element 19 is clipped into the carrier receiving means 19.1 and thereby mechanically connected to the housing side wall 14.1 in a force-fitting and/or form-fitting manner. The carrier element 19 is used for receiving the electronic unit 13, wherein the electronic unit 13 is connected to the battery cell 12 via the signal line 13.1. It may be provided according to the invention that the carrier element 19 and/or the carrier receiving means 19.1 are formed from a plastic, in particular have a mechanically flexible and/or electrically insulating design. Via the receiving means 20, the carrier element 19 is preferably placed on the cell terminals and/or cell connectors 12.1, 12.2, wherein the receiving means 20 is configured in a manner geometrically corresponding to the geometry of the cell terminal and/or of the cell connector 12.1, 12.2. In FIG. 1, the first housing side wall 14.1 and the second housing side wall 14.2 are connected by means of two clip connections 17 in a force-fitting and/or form-fitting manner. A first clip connection 17 is located in the region of the base of the module housing 11, wherein the clip connection 17 is arranged in the corner region of the battery module 10. This first clip connection 17 is substantially wedge-shaped in design and is configured in such a manner that the first housing side wall 14.1 can be fitted, i.e. assembled, on the second housing side wall 14.2, so that the clip connection 17 connects the two housing side walls 14.1 and 14.2 to one another in a force-fitting and/or form-fitting manner. A second clip connection 17 is arranged in the region of the cover of the module housing 11. The second clip connection has a hinge like configuration, so that a rotational axis is formed by the clip connection 17 and the two housing side walls 14.1 and 14.2 are movable in respect of one another about the rotational axis. The second clip connection 17 makes it possible during assembly for the second housing side wall 14.2 to be connected initially via the second clip connection 17 to the first housing side wall 14.1, so that they can be rotated in respect of one another. Via the rotation of the housing side wall 14.1 to the housing side wall 14.2 which is made possible, the second clip connection 17 can be clipped into one another in the region of the base of the battery module 10.

FIG. 2 shows a further possible embodiment of a battery module 10 according to the invention having a plurality of battery cells 12. The battery cells 12 in FIG. 2 are configured by way of example as pouch cells 12 and arranged parallel to one another in the module housing 11. The module housing 11 in FIG. 2 is formed by the two housing side walls 14.1 and 14.2. In this case, the housing side walls 14.1 and 14.2 each have two clip connections 17, wherein the clip connections 17 are configured identically to the clip connections 17 from FIG. 1. The second housing side wall 14.2 furthermore likewise has cooling ducts 16 on the battery module base. Moreover, FIG. 2 shows cooling elements 28 which are each arranged between two pouch cells 12 and are connected to the second housing side wall 14.2 via a tongue-and-groove connection. In the cover region of the first housing side wall 14.1, an electronic unit 13 is arranged in a carrier element 19, wherein the carrier element 19 is arranged in a carrier receiving means 19.1 of the first housing side wall 14.1. The electronic unit 13 is connected to the battery cells 12 via signal lines 13.1 in an electrically conductive manner. In at least three corners of the module housing 11 of the battery module 10 connection element receiving means 22 are arranged in the housing side walls

14.1 and 14.2. Via the connection element receiving means 22, the battery module 10 can be connected to further battery modules 10 and/or a housing plate by means of connection elements 23.

Four variants a), b), c) and d) of possible fastening means 21 of the housing side walls 14 are shown in FIG. 3. The housing side walls 14 of the first variant a) have only one connection element receiving means 22 for a connection element which is used for connecting the housing side walls 14 to a housing plate and/or to a further module housing 11. This very compact design requires little installation space. In variant b) the housing side wall 14 furthermore has a material reinforcement in the region of the connection element receiving means 22, so that the region of the housing side wall 14 is mechanically reinforced. In variant c) in FIG. 3 the housing side wall 14 has in addition a material recess 21, wherein the material recess is used as a fastening means of the housing side wall 14 to an external component. The material recess may be a bore 21, for example, which is formed on an arm, as shown in variant 3c), that extends from the housing side wall 14 in a horizontal direction. The variant d) in FIG. 3 has a further clip connection, wherein the clip connection is used as a fixing means 21 for the housing side wall 14 on an external component. In addition, the housing side wall 14 has a connection element receiving means 22 in all embodiments in FIG. 3, which connection element receiving means is substantially circular in design.

FIG. 4 shows a battery module 10 according to the invention with a plurality of battery cells 12. The battery module 10 has two housing side walls 14.1 and 14.2 in FIG. 4. The first housing side wall 14.1 in this case forms a side wall and the cover element of the module housing 11 of the battery module 10. Moreover, the battery module 10 in FIG. 4 has a housing plate 15 in each case on the end face, by means of which the module housing 11 can be closed at the end face. Moreover, in all four corners of the housing plate 15 connection elements 23 are shown, wherein by means of the connection elements 23 the housing plates 15 can be connected to the housing side walls 14.1 and 14.2 in a force-fitting and/or form-fitting manner. The housing plate 15 in addition has an end terminal 25, wherein the end terminal 25 is formed by a connection bolt 26 and a terminal insulation 27. The connection bolt 26 of the end terminal 25 is of cylindrical design in this case, wherein the terminal insulation 27 along the outer surfaces is of ring-like configuration, so that the connection bolt 26 is electrically insulated in respect of the housing plate 15. The connection elements 23 may be configured according to the invention as bolts, screws or rivets. Moreover, the housing plate 15 has connection pieces 16.1 and 16.2. The first housing side wall 14.1 additionally has openings 18 in the region of the cover of the module housing 11, wherein the openings 18 are geometrically configured in such a manner that a shock-proof protection 18.1 is produced. The housing side walls 14.1 and 14.2 according to the invention are configured in such a manner that a cuboid modular housing 11 is formed, wherein the housing side walls 14.1 and 14.2 are closed at the end face via the housing plates 15. Consequently, a battery module 10 is produced which is closed on all sides and is therefore protected from outside in respect of mechanical and environmental influences. The module housing 11 therefore has a total of four components. Accordingly, the module housing 11 is formed by the two housing side walls 14.1 and 14.2 and the two housing plates 15 arranged on the end face.

Figure 5:
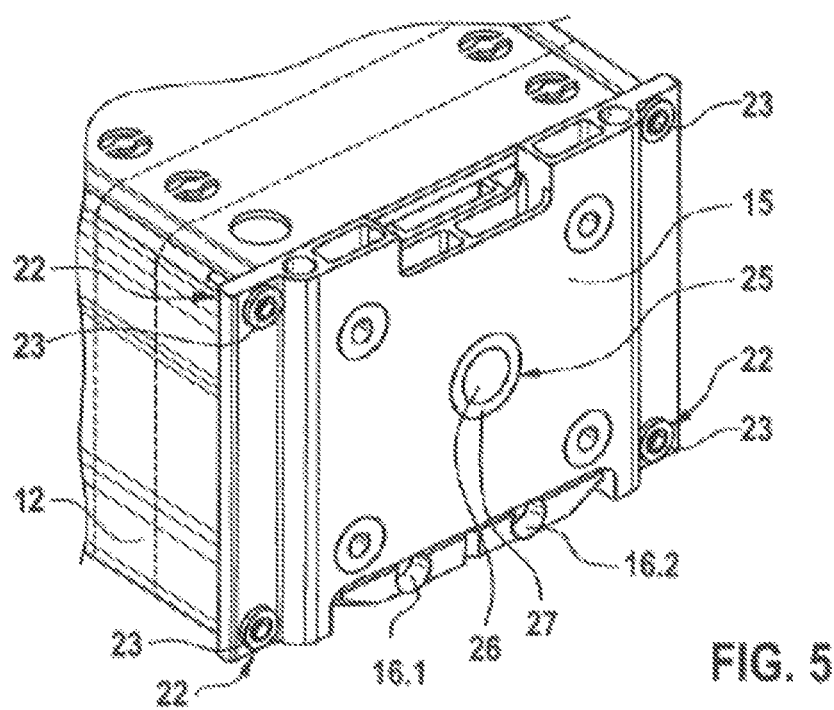
FIG. 5 shows a detail of a battery module according to the invention with a housing plate according to the invention.

A detail of a battery module 10 according to the invention with a module housing 11 is shown in FIG. 5. In particular, FIG. 5 shows the housing plate 15 which is connected at the end face on the module housing 11 to the housing side walls 14 in a force-fitting and/or form-fitting manner. For this reason, connection elements 23 are arranged on the housing plate 15 which may take the shape of screws, rivets or bolts, for example, and can be arranged in connection element receiving means 22 of the housing side walls 14.1 and 14.2. On the first housing side wall 14.1 openings 18 are configured in the region of the cover, wherein the openings 18 take the form of shock-hazard protection 18.1. The openings 18 in this case are configured as two ring-shaped circle sections, so that thermal energy for soldering the cell connectors of the battery cell 12 can be introduced through the opening 18. The end face 15, moreover, has an integrated end terminal 25, wherein via the end terminal 25 electrical energy can be transmitted from the battery cells 12 of the battery module 10 to an electrical consumer or to other battery modules 10. The end terminal 25 in this case has a connection bolt 26 for transmitting electrical energy, wherein peripherally on the connection bolt 26 is arranged a terminal insulation 27 for the electrical insulation of the connection bolt 26. In addition, an end plate 15 is arranged in the region of the base of the battery module 10 with a connection piece 16.1 and a connection piece 16.2 in each case. According to the invention, the connection piece 16.1 in this case may be configured as a cooling duct inlet 16.1 and the connection piece 16.2 as the cooling duct outlet. Via the connection piece 16.1, a cooling fluid can be introduced accordingly into the cooling ducts 16 of the first housing side wall 14.1 and/or second housing side wall 14.2. Via the second connection piece 16.2 the cooling fluid conducted through the cooling ducts 16 can be guided from the battery module 10. It is conceivable in this case for the connection pieces 16.1 and/or 16.2 to be connected to further battery modules 10.

FIG. 6 shows three possible variants a), b) and c) of a possible cooling duct profile within a housing side wall 14. In the first variant a) the cooling ducts 16 run in a straight line from a first connection piece 16.1 to a second connection piece 16.2. Moreover, the battery module 10 of the first embodiment a) has cooling elements 28 which are arranged parallel to one another in the housing plate 15. Between the cooling elements 28 the cooling fluid flows from the first connection piece 16.1, which is configured as an inlet connection piece 16.1, to the second connection piece 16.2, which is configured as an outlet connection piece 16.2.

In the variant b) in FIG. 6, the housing plates 15 have connection pieces 16.1 and 16.2 on only one side in each case. The cooling fluid flow runs in a U-shape from the first connection piece 16.1 through a total of four cooling ducts through the module housing or the cooling ducts 16 in the direction of the second connection piece 16.2. The connection pieces 16.1 and 16.2 in variant b) are located on the same side of the battery module. The U-shaped cooling liquid flow thereby formed is conducted along the entire base surface of the housing side wall 14 for cooling. The variant b) is shown accordingly in FIGS. 4 and 5, for example, wherein a first connection piece 16.1 and a second connection piece 16.2 are arranged on the end plates 15.

The variant c) in FIG. 6 shows a substantially Z-shaped profile of the cooling fluid within the cooling ducts 16. Accordingly, the cooling fluid through the cooling ducts 16 is changed twice in its flow direction. A first connection piece 16.1 is located on a first side of the battery module 10 or on a first end face of the battery module 10 and a second connection piece 16.2 on a second end face of the battery module 10. In all three variants in FIG. 6, the battery module or the housing side wall 14.1 or 14.2 has cooling elements 28 which are arranged parallel to one another and between the battery cells.

The invention claimed is:

1. A module housing (11) for a battery module (10) having at least one battery cell (12), the module housing having a first substantially L-shaped housing side wall (14) with at least one clip connection (17), and a second substantially L-shaped housing side wall (14) with at least one clip connection (17) and two housing plates (15) which can be arranged on the battery module (10) on an end face, as a result of which the module housing is closable on the end face, wherein at least the two housing side walls (14) are configured to be connected to one another mechanically in a form-fitting and/or force-fitting manner by clip connections (17), as a result of which a cuboid module housing (11) is produced.

2. The module housing (11) according to claim 1, characterized in that at least one opening (18) is arranged on at least one housing side wall (14) in such a manner that energy for joining a pole/terminal of the battery cell (12) to a cell connector (12.2) and/or to a signal line (13.1) for an electronic unit (13) can be introduced.

3. The module housing (11) according to claim 1, characterized in that on at least a first housing side wall (14.1) and/or a second housing side wall (14.2) and/or a housing plate (15) cooling ducts (14) are configured, wherein a cooling fluid can be conducted through the cooling ducts (14), wherein the cooling ducts (29) are configured in such a manner that a cooling fluid can be introduced through at least a first connection piece (29.1) and discharged through a second connection piece (29.1).

4. The module housing (11) according to claim 1, further comprising a carrier element (19) on which an electronic unit (13) can be arranged in a form-fitting and/or force-fitting manner, wherein the carrier element (19) is connected to at least one housing side wall (14.1, 14.2) via a carrier receiving means (19.1) in a force-fitting and/or form-fitting manner.

5. The module housing (11) according to claim 4, characterized in that the carrier element (19) has a receiving means (20) for at least one cell terminal (12.1) and/or a cell connector (12.2), as a result of which the carrier element (19) can be connected to the cell terminal and/or the cell connector in a force-fitting and/or form-fitting manner.

6. The module housing (11) according to claim 1, characterized in that the clip connections (17) are configured in a substantially S-shaped and/or O-shaped and/or wedge-shaped design.

7. The module housing (11) according to claim 1, characterized in that the housing side walls (14) have fastening means (21), as a result of which the module housing (11) can be disposed on an external component in a force-fitting and/or form-fitting manner.

8. The module housing (11) according to claim 1, characterized in that at least one housing side wall (14) and at least one housing plate (15) have connection element receiving means (22) in which connection elements (23) can be disposed, as a result of which the housing side walls (14) can be connected to at least one further housing side wall (14) and/or an external component and/or a housing plate (15) of a further battery module.

9. A battery module (10) comprising a module housing (11) according to claim 1, at least one battery cell (12) arranged in the module housing (11), and an electronic unit (13) which is in signal connection with the battery cell (12).

10. The battery module (10) according to claim 9, characterized in that an end terminal (25) is arranged on at least one housing plate (15), as a result of which a voltage tapping of the battery module (10) can be achieved.

11. The battery module (10) according to claim 9, characterized in that at least one cooling element (28) is arranged between at least two battery cells (12), as a result of which thermal energy can be diverted from the battery cell (12).

12. The battery module (10) according to claim 1, characterized in that the battery cells (12) are connected to the electronic unit (13) by punched grids or a cable tree.

13. A battery having a plurality of battery modules (10) with the features of claim 9.

14. A method for assembling a battery module (10) having the features of claim 9, the method comprising the following steps:
a) arranging at least one battery cell (12) on a first housing side wall (14),
b) connecting the first housing side wall (14) to a second housing side wall (14) with clip connections (17),
c) connecting the housing side walls (14) to at least two housing plates (15) arranged on the end face, and
d) thermally joining at least one cell connector (12.2) to the battery cell (12) and/or at least one signal line (13.1).

15. The module housing (11) according to claim 1, characterized in that at least one opening (18) is arranged on at least one housing side wall (14) in such a manner that energy for joining a pole/terminal of the battery cell (12) to a cell connector (12.2) and/or to a signal line (13.1) for an electronic unit (13) can be introduced, wherein the opening (18) is of such dimensions that a shock-proof protection (18.1) for the battery cell (12) can be achieved.

16. The module housing (11) according to claim 1, characterized in that on at least a first housing side wall (14.1) and/or a second housing side wall (14.2) and/or a housing plate (15) cooling ducts (14) are configured, wherein a cooling fluid can be conducted through the cooling ducts (14), wherein the cooling ducts (29) are configured in such a manner that a cooling fluid can be introduced through at least a first connection piece (29.1) and discharged through a second connection piece (29.1), wherein the connection pieces (29.1) are arranged on at least one housing plate (15).

17. The battery module (10) according to claim 9, characterized in that an end terminal (25) is integrated in the housing plate, as a result of which a voltage tapping of the battery module (10) can be achieved, wherein the end terminal (25) has a connection bolt (26) and a terminal insulation (27) arranged on the connection bolt (26), wherein the connection bolt (26) can be connected to the battery cell (12) in an electrically conductive manner.

18. The battery module (10) according to claim 9, characterized in that at least one cooling element (28) is arranged between at least two battery cells (12), as a result of which thermal energy can be diverted from the battery cell (12), wherein the cooling elements (28) are connected to the cooling device (16) in a thermally conductive manner.

\* \* \* \* \*